United States Patent [19]

Hashimoto

[11] Patent Number: 4,991,184
[45] Date of Patent: Feb. 5, 1991

[54] DATA COMMUNICATION SYSTEM HAVING A SPEED SETTING VARIABLE WITH TRANSMISSION QUALITY FACTORS

[75] Inventor: Shinji Hashimoto, Tokyo, Japan
[73] Assignee: NEC Corporation, Tokyo, Japan
[21] Appl. No.: 452,071
[22] Filed: Dec. 18, 1989
[30] Foreign Application Priority Data
  Dec. 16, 1988 [JP] Japan .................. 63-316468
[51] Int. Cl.⁵ .................................. H04L 1/16
[52] U.S. Cl. ........................ 375/8; 371/5.5;
                              375/58; 375/109; 455/69
[58] Field of Search .............. 375/7, 8, 13, 34, 37,
       375/58, 106, 109, 121; 370/24, 84; 455/52, 68,
                          69; 371/5.1, 5.5, 30, 32, 43, 46

[56] References Cited
U.S. PATENT DOCUMENTS

| 3,534,264 | 10/1970 | Blasbalg et al. | 375/58 |
| 3,536,840 | 10/1970 | Sullivan | 375/58 |
| 4,710,925 | 12/1987 | Negi | 371/5.5 |
| 4,736,388 | 4/1988 | Eguchi | 375/58 |
| 4,756,007 | 7/1988 | Qureshi et al. | 375/8 |

Primary Examiner—Benedict V. Safourek
Attorney, Agent, or Firm—Sughrue, Mion, Zinn, Macpeak & Seas

[57] ABSTRACT

In a full-duplex data communication system, the signal-to-noise ratio, error rate and occurrences of out-of-sync condition of signals transmitted on the data channel of a first transmission medium from a first station to a second station are detected by the latter and a first set of quality signals of the first transmission medium is generated. The signal-to-noise ratio, error rate and occurrences of out-of-sync condition of signals transmitted on the data channel of a second transmission medium in the opposite direction are likewise detected by the first station and a second set of quality signals of the second transmission medium are generated. The first set of quality signals are modulated and transmitted on a control channel of the second transmission medium from the second station and received and demodulated by the first station, which derives a speed setting command signal from the second set of quality signals as well as from the first set of quality signals represented by the demodulated signals, and the transmission speed of the first station is controlled according to the speed setting command signal. The speed setting command signal is modulated and transmitted on a control channel of the first transmission medium from the first to second station, which demodulates it and controls its transmission speed according to the demodulated speed setting command signal.

4 Claims, 3 Drawing Sheets

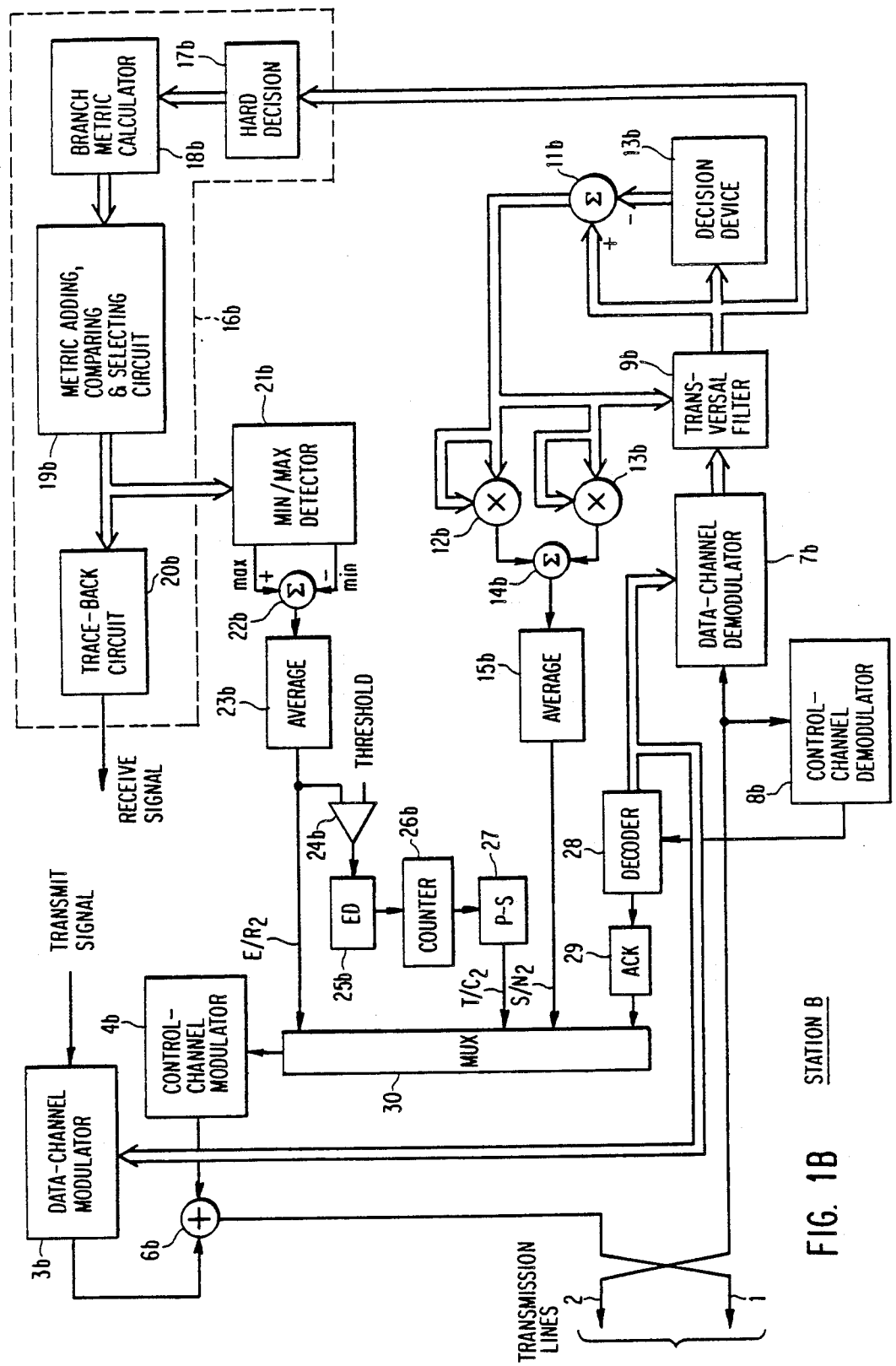
FIG. 1B  STATION B

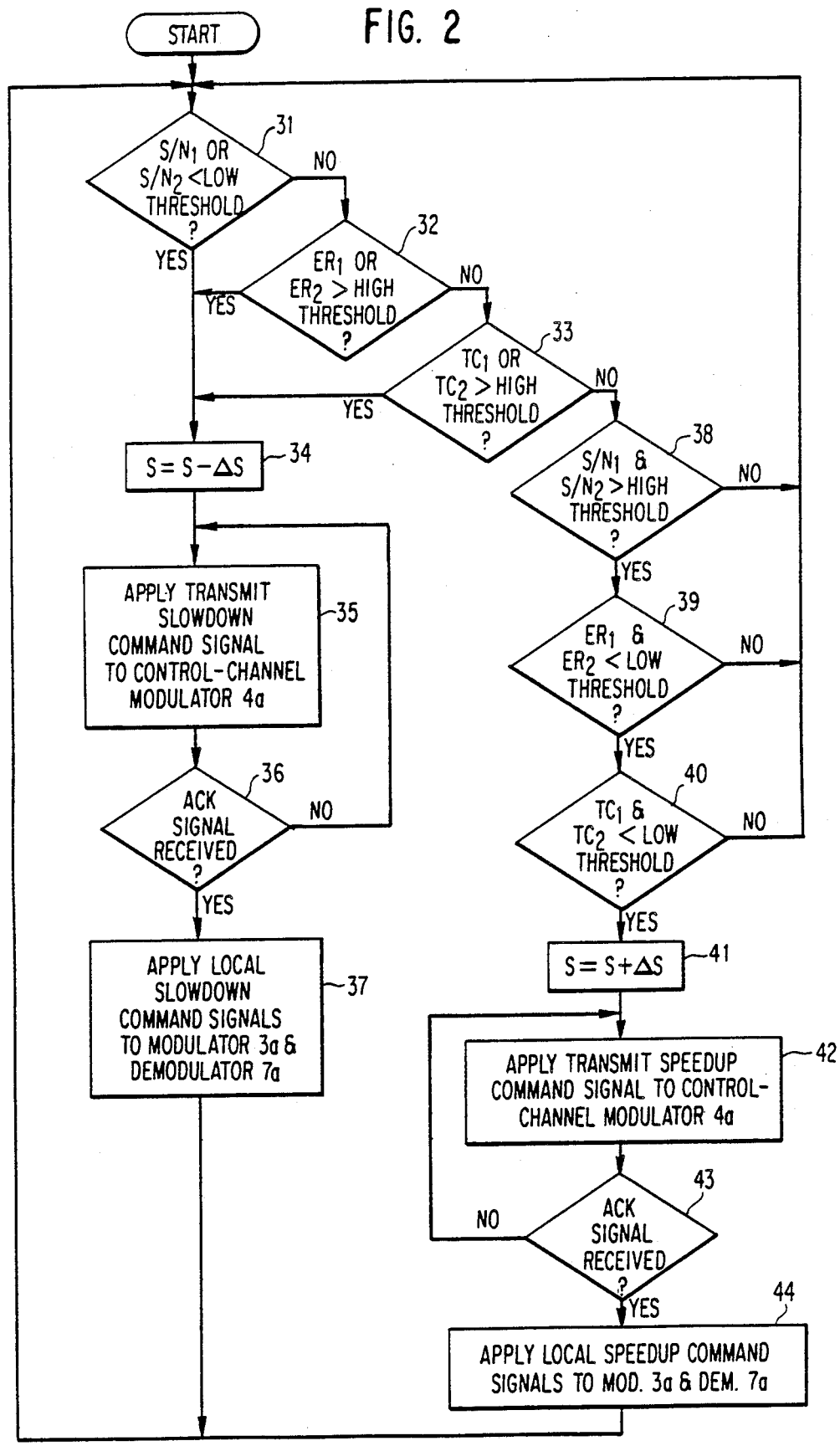

DATA COMMUNICATION SYSTEM HAVING A SPEED SETTING VARIABLE WITH TRANSMISSION QUALITY FACTORS

BACKGROUND OF THE INVENTION

The present invention relates generally to data communication systems, and more specifically to a variable speed data communication system capable of varying the operating speed according to transmission qualities of the transmission mediums.

U.S. Pat. No. 4,736,388, issued to M. Eguchi, discloses a data communication system involving the use of two adaptive equalizers at the receive end of the system for generating first and second quality signals, respectively. In response to the first signal quality signal, the transmission speed of the system is decreased and in response to the second signal quality signal the transmission speed is increased.

SUMMARY OF THE INVENTION

It is an object of the present invention to adaptively control the speed setting of a data communication system according to detected qualities of transmission medium represented by the signal-to-noise ratios, error rates and out-of-sync conditions.

According to the present invention, a signal-to-noise ratio, an error rate and occurrences of out-of-sync condition signals of transmitted on the data channels of a first transmission medium from a first station to a second station are detected by the second station and a first set of quality signals of the first transmission medium is generated. A signal-to-noise ratio, an error rate and occurrences of out-of-sync condition of signals transmitted on the data channel of a second transmission medium are likewise detected and a second set of quality signals of the second transmission medium are generated by the first station. The first set of quality signals are modulated and transmitted on a control channel of the second transmission medium from the second station and received and demodulated by the first station. In the first station, a speed setting command signal is derived from the second set of quality signals as well as from the first set of quality signals represented by the demodulated signals, and the transmission speed of the first station is controlled according to the speed setting command signal. The speed setting command signal is modulated and transmitted on a control channel of the first transmission medium from the first to second station. The transmitted speed setting command signal is demodulated by the second station and its transmission speed is controlled according to the demodulated speed setting command signal.

BRIEF DESCRIPTION OF THE DRAWINGS

The present invention will be described in further detail with reference to the accompanying drawings, in which:

FIGS. 1A and 1B are block diagrams of a master and a slave station of a data communication system, respectively; and FIG. 2 is a flowchart illustrating programmed steps performed by the controller of the master station of the communication system.

DETAILED DESCRIPTION

Figure 1A:
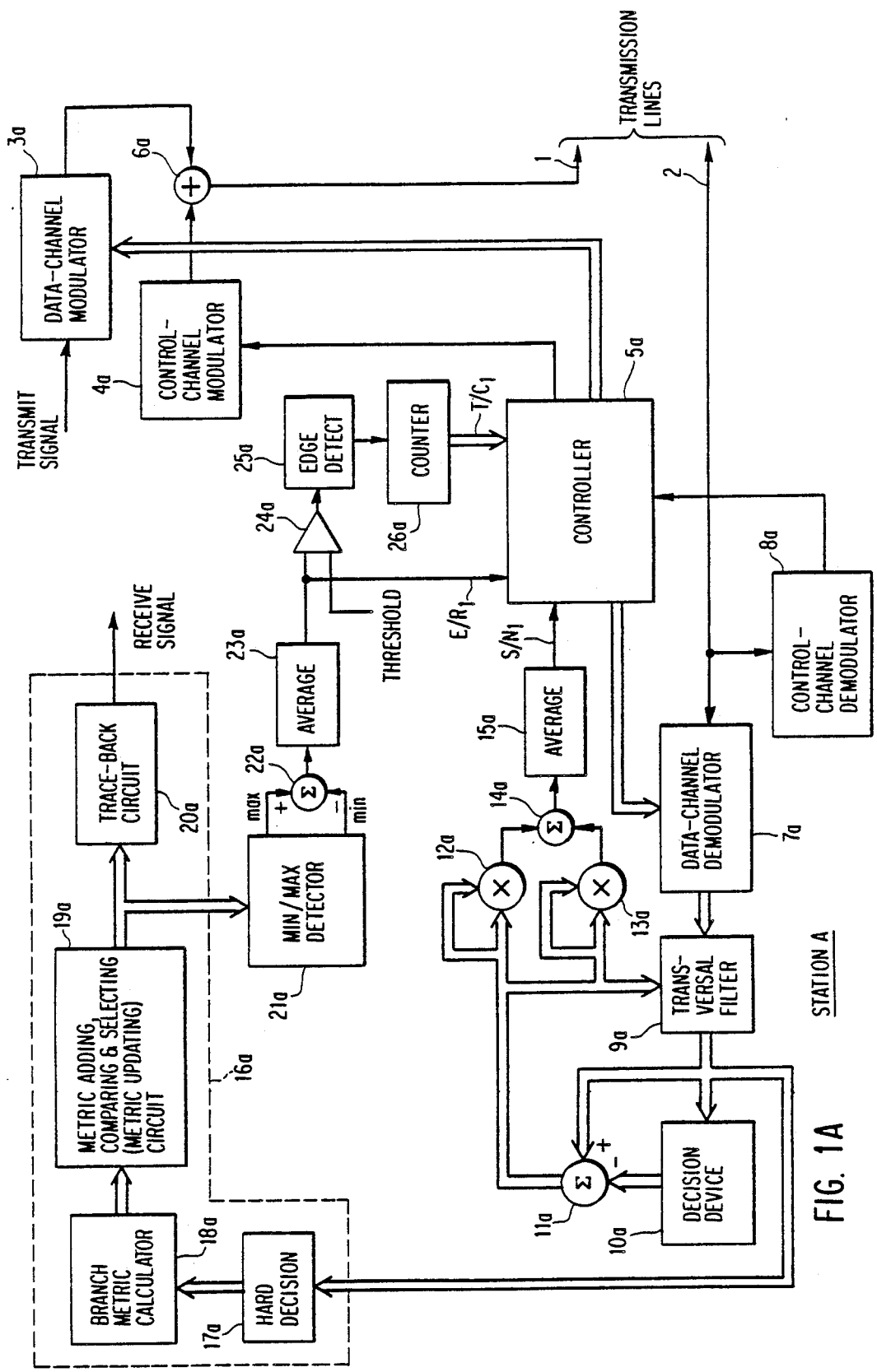

Referring now to FIGS. 1A and 1B, there is shown a data communication system comprising a master station A and a slave station B interconnected by transmission lines 1 and 2. In FIG. 1A, the transmit section of master station A comprises a variable speed data-channel modulator 3a and a control-channel modulator 4a. Data-channel modulator 3a digitally modulates a data-channel carrier with a convolutionally coded data signal at one of multiple transmission speeds, using a quadrature amplitude modulation (QAM) technique. Control-channel modulator 4a modulates a control-channel carrier with a control signal supplied from a controller 5. The outputs of the modulators 3a and 4a are multiplexed by a combiner 6a and transmitted to the slave station B through transmission line 1.

The receive station of master station A includes a variable speed data-channel demodulator 7a and a control-channel demodulator 8a, each of which includes a band-pass filter of different passband and is connected to the receive end of transmission line 2 to detect signals respectively sent on the data-and control-channels. Control-channel demodulator 8a receives signal quality signals and an acknowledgement signal from station B and supplies the received signals to controller 5.

Data-channel demodulator 7a operates at one of multiple transmission speeds and detects the in-phase and quadrature components of a received QAM signal and supplies multibit-codes of I- and Q-channel components to an equalizer, or adaptive transversal filter 9a. The equalized signal is supplied to a decision device 10a which provides a replica of the desired response which may be stored as a reference. Adaptive transversal filter 9a has a tapped delay line and a plurality of multipliers of variable tap weights respectively connected to the successive taps of the delay line. The tap weights of transversal filter 9a are controlled by the outputs of a digital subtractor 11a which subtracts the outputs of decision device 10a from the outputs of transversal filter 9a to generate error signals having real and imaginary components for I- and Q-channels. The error signals are used to control the tap weights of transversal filter 9a, as well as to multipliers 12a and 13a. The real component of the I-channel is multiplied with the imaginary component of the Q-channel by multiplier 12a and the real component of the Q-channel is multiplied with the imaginary component of the I-channel by multiplier 13a. The outputs of multipliers 12a and 13a are summed by an adder 14a and averaged by an averaging circuit 15a to generate a signal representative of the signal-to-noise ratio of the transmission line 2.

The output of transversal filter 9a is applied to a Viterbi decoder 16a of known design which includes a hard decision decoding circuit 17a which makes a comparison between valid codewords and a received codeword. The output of hard decision decoder 17a is applied to a branch metric calculator 18a. The transmitted data bits are received in groups and compared to possible branch paths, the degree of fit between received convolutional code bits and the possible branches being expressed as b ranch metrics. The output of calculator 18a is coupled to a metric adding, comparing and selecting (or metric updating) circuit 19a which includes a path metrics memory. Metric updating circuit 19a receives previously stored path metrics from the path metric memory, updates the previously stored path metrics and then returns the updated version of the previously stored path metrics of the path metrics memory. The output of the path metrics memory of ACS circuit 19a is coupled to a trace-back circuit 20a which traces back the metric paths to detect a most-likeihood codeword.

The output of ACS circuit 19a is also applied to a minimum/maximum path metric detector 21a which it is integrated over time and a maximum path metric and a minimum path metric are detected. The difference between the maximum and minimum path metrics is derived by a substractor 22a and is averaged by an averaging circuit 23a to generate a signal representative of the error rate of the transmission line 2.

The output of averaging circuits 23a is further coupled to a comparator 24a for comparison with a threshold value. When the error rate of the transmission line 2 exceeds some value, it can be interpreted as the occurrence of any asychronous condition. The threshold of comparator 24a corresponds to such an error rate. When the output of averaging circuit 23a exceeds the comparator threshold, a logic-1 output is supplied from comparator 24a to an edge detector 25a which supplies a counter 26a with a pulse in response to the leading edge of the comparator output. If an out-of-sync condition occurs on transmission line 2, the Viterbi decoder 16a periodically diverges in a training sequence of the maximum likeihood path finding process with the result that the output of averaging circuit 23a periodically fluctuates across the threshold of comparator 24a. Counter 26a increments its count in response to such training sequences and provides a count indicating the number of training sequences that have occurred over a given interval of time.

Therefore, the outputs of averaging circuits 15a and 23a and counter 26a are representative of the quality factors of transmission line 2 and the output of the demodulator 8a includes signals which represent the quality factors of transmission line 1 as well as a signal acknowledging the receipt of a command signal from station A by station B. Controller 5 processes these quality factor signals in accordance with programmed instructions illustrated in FIG. 2.

Station B is shown in FIG. 1B, in which parts corresponding to those in FIG. 1A are marked with the same numerals as used in FIG. 1A with letter "b" being appended instead of letter "a." As illustrated, station B is constructed in a manner similar to Station A except that a parallel-to-serial converter 27 is coupled to the output of counter 26b to generate a serial version of the training count. A decoder 28 is connected to the control-channel demodulator 8b to decode its output signal for controlling the speed settings of data-channel modulator 3b and data-channel demodulator 8b in accordance with a command signal transmitted from station A. An ACK generator 29 is connected to decoder 28 to generate an acknowledgement signal in response to the receipt of a speed setting command signal from station A. A multiplexer 30 is provided for multiplexing the outputs of averaging circuits 15b, 23b, parallel-serial converter 27 and ACK generator 29, the output of the multiplexer 30 being coupled to the control-channel modulator 4b.

The following is a description of the operation of controller 5. In FIG. 2, program execution of contoller 5 begins with decision block 31 which checks the S/N ratio of transmission line 1 represented by a signal $S/N_1$ transmitted from the averaging circuit 15b and the S/N ratio of transmission line 2 represented by an output signal $S/N_2$ of averaging circuit 15a and determines if one of these S/N signals is lower than a predetermined lower threshold value. If the answer is negative, control moves to decision block 32 to check the error rate ($ER_1$) output of averaging circuit 23b and the error rate ($ER_2$) output of averaging circuit 23a and determines if one of these error rate signals is higher than a predetermined higher threshold value. If the answer is negative, control advances to decision block 33 which checks the training count ($TC_2$) output of counter 26b and the training count ($TC_1$) of counter 26a and determines if one of these counts is higher than a predetermined high threshold value.

If the decision in one of blocks 31, 32 and 33 is affirmative, control advances to a slowdown subrountine including blocks 34 to 37. Otherwise, it proceeds to a decision subroutine including blocks 38 to 40 to determine if the operating speed of the data communication system is just appropriate or too high for the current values of both local and distant quality indicating parameters.

In the slowdown subroutine, the transmission speed value S of the data communication system is decremented by a predetermined value $\Delta S$ (block 34). Exit then is to operations block 35 to apply a slowdown command signal to control-channel modulator 4a to request station B to decrease its transmission speed setting and return an acknowledgement (ACK) signal. At station B, the command signal is received by control-channel demodulator 8b and decoded by decoder 2B. The speed setting of data-channel modulator 3b and data-channel demodulator 7b are thus adjusted and an acknowledgement signal is generated by ACK generator 29 and sent to station A through control-channel modulator 4b. When this ACK signal is not received (block 36), control returns to block 35 to repeat the transmission of the slowdown command signal until an ACK signal from station B is received, whereupon control advances to operations block 37 to apply local slowdown command signals to data-channel modulator 3a and data-channel demodulator 7a. Control then returns to the starting point of the program to repeat the process.

In the decision subroutine, decision block 38 checks the signal $S/N_1$ and $S/N_2$ and determines if the signal-to-noise ratios of both transmission lines are higher than threshold value. If the answer is affirmative, control exits to decision block 39 which checks the signals $ER_1$ and $ER_2$ and determines if the error rates of both transmission lines are lower than a lower threshold value. If the answer is affirmative, control exits to decision block 40 which checks the signal $TC_1$ and $TC_2$ and determines if the training counts of both transmission lines are lower than a lower threshold value. If the answer is affirmative in block 40, control recognizes that the current operating speed is too low for the detected quality factors and advances to a speedup subroutine including blocks 41 to 44. If the decision in any of blocks 38 to 40 is negative, control returns to the starting point of the program, recognizing that the operating speed is just appropriate for the current value of quality factors.

In the speedup subroutine, the transmission speed value s of the data communication system is incremented by a predetermined value $\Delta S$ (block 41). Exit then is to operation block 42 to apply a speedup command signal to control-channel modulator 4a to request station B to increase its speed setting and return an acknowledgment (ACK) signal. When this ACK signal is not received (block 43), control return to block 42 to repeat the transmission of the speedup command signal until an ACK signal is received from station B, whereupon control advances to operations block 44 to apply local speedup command signals to data-channel modulator 3a and data-channel demodulator 7a. Control then returns to the starting point of the program to repeat the process.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A data communication system comprising:
  a first data-channel modulator having a variable speed setting connected to one end of a first transmission medium, and a second data-channel modulator having a variable speed setting connected to the other end ot the first transmission medium;
  a first data-channel demodulator having a variable speed setting connected to one end of a second transmission medium, and a second data-channel demodulator having a variable speed setting connected to the other end of said transmission medium;
  first signal-to-noise quality detector means for detecting a signal-to-noise ratio of said first transmission medium, and second signal-to-noise quality detector means for detecting a signal-to-noise ratio of said second transmission medium;
  first error rate quality detector means for detecting an error rate of said first transmission medium, and second error rate quality detector means for detecting an error rate of said second transmission medium;
  first out-of-sync quality detector means for detecting occurrences of out-of-sync condition on said first transmission medium, and second out-of-sync quality detector means for detecting occurrences of out-of-sync condition on said second transmission medium;
  control means for deriving a speed setting command signal from a first set of output signals from said first signal-to-noise ratio quality detector means, said first error rate quality detector means and said first out-of-sync quality detector means as well as from a second set of output signals, and controlling the speed settings of said first data-channel modulator and said first data-channel demodulator according to said speed setting command signal;
  a first control-channel modulator for modulating said speed setting command signal and transmitting the modulated command signal on said first transmission medium;
  a second control-channel demodulator for demodulating the modulated speed setting command signal transmitted on said first transmission medium and controlling the speed settings of said second data-channel modulator and said second data-channel demodulator according to the demodulated speed setting command signal;
  a second control-channel modulator for modulating output signals of said second signal-to-noise ratio quality detector means, said second error rate quality detector means and said second out-of-sync detector means and transmitting the modulated signals on said second transmission medium; and
  a first control-channel demodulator for demodulating signals transmitted on said second transmission medium and supplying the demodulated signals to said control means as said second set of output signals.

2. A data communication system comprising:
  a first data-channel modulator having a variable speed setting connected to one end of a first transmission medium;
  a first data-channel demodulator having a variable speed setting connected to one end of a second transmission medium;
  a first sequential decoder for sequentially decoding a convolutional code contained in the output of the first data-channel demodulator;
  first signal-to-noise quality detector means for detecting a signal-to-noise ratio of said first transmission medium from the output of said data-channel demodulator;
  first error rate quality detector means for detecting an error rate of said first transmission medium from the sequentially decoded convolutional code;
  first out-of-sync quality detector means for detecting training sequences on said first transmission medium from the sequentially decoded convolutional code;
  control means for deriving a speed setting command signal from a first set of output signals from said first signal-to-noise ratio quality detector means, said first error rate quality detector means and said first out-of-sync quality detector means as well as from a second set of output signals, and controlling the speed setting of said first data-channel modulator and said first data-channel demodulator according to said speed setting command signal;
  a first control-channel modulator for modulating said speed setting command signal and transmitting the modulated command signal on said first transmission medium;
  a first control-channel demodulator for demodulating signals transmitted on said second transmission medium and supplying the demodulated signals to said control means as said second set of output signals;
  a second data-channel modulator having a variale speed setting connected to the other end of said first transmission medium;
  a second data-channel demodulator having a variable speed setting connected to the other end of said second transmission medium;
  second signal-to-noise ratio detector means for detecting a signal-to-noise ratio of said second transmission medium form the output of said second data-channel demodulator;
  a second sequential decoder for sequentially decoding a convolutional code contained in the output of the second data-channel demodulator;
  second error rate quality detector means for detecting an error rate of said second transmission medium from the output of said second sequential decoder means;
  second out-of-sync quality detector means for detecting training sequences on said second transmission medium from the output of said second sequential decoder means;
  a second control-channel demodulator for demodulating the modulated speed setting command signal transmitted on said first transmission medium and controlling the speed settings of said second data-channel modulator and said second data-channel demodulator according to the demodulated speed setting command signal; and a second control-channel modulator for modulating output signal of said second signal-to-noise ratio quality detector means, said second error rate quality detector means and said second out-of-sync detector means and transmitting the modulated signals on said second transmission medium.

3. A method for controlling the operating speed of a data communication system including first and second stations interconnected by first and second transmission mediums operating in a full-duplex mode, each of said transmission mediums having a data channel and a control channel, comprising the steps of:

(a) detecting a signal-to-noise ratio, an error rate and occurrences of out-of-sync condition of signals transmitted on the data channel of said first transmission medium and generating a first set of quality signals of said first transmission medium, and detecting a signal-to-noise ratio, an error rate and occurrences of out-of-sync condition of signals transmitted on the data channel of said second transmission medium and generating a second set of quality signals of said second transmission medium;

(b) modulating said first set of quality signals and transmitting the modulated signals on the control channel of said second transmission medium;

(c) demodulating signals transmitted on the control channel of said second transmission medium;

(d) deriving a speed setting command signal from said second set of quality signals detected by the step (a) as well as from the signals demodulated by the step (c) and controlling the transmission speed of said first station according to said speed setting command signal;

(e) modulating said speed setting command signal derived by by the step (d) and transmitting the modulated command signal on the control channel of said first transmission medium; and (f) demodultating the modulated speed setting command signal transmitted on the control channel of said first transmission medium and controlling the transmission speed of said second station according to the demodulated speed setting command signal.

4. A method for controlling the operating speed of a data communication system including first and second stations, said first and second stations exchanging convolutional codes through data channels of first and second transmission mediums in a full-duplex mode, each of said transmission mediums having a control channel, comprising the steps of:

(a) demodulating convolutional codes transmitted on said first transmission medium and sequentially decoding the demodulated convolutional codes;

(b) demodulating convolutional codes transmitted on said second transmission medium and sequentially decoding the demodulated convolutional codes;

(c) detecting a signal-to-noise ratio of signals transmitted on said first transmission medium from the convolutional codes demodulated by the step (a), detecting an error rate and training sequences of signals transmitted on said first transmission medium from the convolutional codes decoded by the step (a), and generating a first set of quality signals of said first transmission medium;

(d) detecting a signal-to-noise ratio of signals transmitted on said second transmission medium from the convolutional codes demodulated by the step (b), detecting an error rate and training sequences of signals transmitted on said second transmission medium from the convolutional codes decoded by the step (b), and generating a second set of quality signals of said second transmission medium;

(e) modulating said first set of quality signals and transmitting the modulated signals on the control channel of said second transmission medium;

(f) demodulating signals transmitted on the control channel of said second transmission medium;

(g) deriving a speed setting command signal from said first set of quality signals detected by the step (c) as well as from the signals demodulated by the step (f) controlling the transmission speed of said first station according to said speed setting command signal;

(h) modulating said speed setting command signal derived by the step (g) and transmitting the modulated command signal on the control channel of said first transmission medium; and (i) demodulating the modulated speed setting command signal transmitted on the control channel of said first transmission medium and controlling the transmission speed of said second station according to the demodulated speed setting command signal.

* * * * *

UNITED STATES PATENT AND TRADEMARK OFFICE
CERTIFICATE OF CORRECTION

PATENT NO.  : 4,991,184
DATED       : February 5, 1991
INVENTOR(S) : Shinji HASHIMOTO It is certified that error appears in the above-identified patent and that said Letters Patent is hereby corrected as shown below:

Column 4, line 12, delete "subrountine", and insert --subroutine--;

Column 4, line 27, delete "2B", and insert --28--;

Column 5, line 24, after "said", insert --second--;

Column 6, line 45, delete "variale", and insert --variable--;

Column 6, line 53, delete "form", and insert --from--;

Column 7, line 6, after "output", delete "signal", and insert --signals--.

Signed and Sealed this

Twenty-fourth Day of August, 1993

Attest:

BRUCE LEHMAN

Attesting Officer

Commissioner of Patents and Trademarks